US008350832B2

(12) United States Patent
Sonoyama et al.

(10) Patent No.: US 8,350,832 B2
(45) Date of Patent: Jan. 8, 2013

(54) SEMICONDUCTOR INTEGRATED CIRCUIT DEVICE FOR DISPLAY CONTROLLER

(75) Inventors: Hirofumi Sonoyama, Tokyo (JP); Sosuke Tsuji, Tokyo (JP); Hikaru Shibahara, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 977 days.

(21) Appl. No.: 11/943,366

(22) Filed: Nov. 20, 2007

(65) Prior Publication Data

US 2008/0122855 A1 May 29, 2008

(30) Foreign Application Priority Data

Nov. 27, 2006 (JP) ................................ 2006-318037

(51) Int. Cl.

*G06F 3/038* (2006.01)
*G06F 13/14* (2006.01)
*G09G 5/00* (2006.01)
*G09G 5/39* (2006.01)
*G06T 15/00* (2006.01)

(52) U.S. Cl. ........ 345/204; 345/519; 345/520; 345/522; 345/531

(58) Field of Classification Search ........................ None
See application file for complete search history.

(56) References Cited

U.S. PATENT DOCUMENTS 5,586,246 A * 12/1996 Nobori et al. ................ 345/502
5,587,726 A * 12/1996 Moffat .......................... 345/539
5,982,395 A * 11/1999 Olson et al. .................. 345/572
6,753,872 B2 * 6/2004 Moriwaki et al. ............ 345/537
6,847,370 B2 * 1/2005 Baldwin et al. ............... 345/564
7,095,407 B1 * 8/2006 Erhart et al. .................. 345/213
7,200,287 B2 * 4/2007 Fukuda et al. ................ 382/304
2005/0017965 A1 1/2005 Morita et al.
2005/0078120 A1 * 4/2005 Kondo et al. ................ 345/547
2006/0132491 A1 * 6/2006 Riach et al. ................... 345/505
2007/0002033 A1 * 1/2007 Komatsu et al. .............. 345/204
2007/0024606 A1 * 2/2007 Moriyama et al. ............ 345/204
2007/0040840 A1 * 2/2007 Linzer et al. .................. 345/530

FOREIGN PATENT DOCUMENTS

JP 1-174186 A 7/1989
JP 4-180092 A 6/1992
JP 6-102837 A 4/1994
JP 2005-43435 A 2/2005

OTHER PUBLICATIONS

Office Action issued Jan. 26, 2012, in Japanese Patent Application No. 2006-318037.

* cited by examiner

*Primary Examiner* — Daniel Washburn
*Assistant Examiner* — Donna Ricks
(74) *Attorney, Agent, or Firm* — Miles and Stockbridge P.C.

(57) ABSTRACT

The semiconductor IC device for display control disclosed herein aims to achieve a higher rate of memory access cycles without enhancing the current carrying capability of the memory device. The IC device is provided with a memory cell array capable to store display data, peripheral circuits to enable writing and reading of display data, and a control circuit which is able to control read and write operations from/to the memory cell array. The memory cell array comprises a plurality of memory blocks. The control circuit comprises a control logic which enables parallel processing of write operations in such a manner that, before completion of writing of data to one of the memory blocks, writing of data to another memory block is started. Write cycles are shortened by the parallel processing of write operations.

10 Claims, 11 Drawing Sheets

SEMICONDUCTOR INTEGRATED CIRCUIT DEVICE FOR DISPLAY CONTROLLER

CROSS-REFERENCE TO RELATED APPLICATIONS

The disclosure of Japanese Patent Application No. 2006-318037 filed on Nov. 27, 2006 including the specification, drawings and abstract is incorporated herein by reference in its entirety.

BACKGROUND OF THE INVENTION

The present invention relates to a semiconductor integrated circuit device for display control and a technique that is effectively applied to, for example, a liquid crystal display (LCD) controller/driver that drives an LCD panel.

Recently, a dot matrix type liquid crystal panel having a plurality of pixels for display, two-dimensionally arrayed in a matrix, is commonly used as a display unit of portable electronic equipment such as mobile phones and personal digital assistants (PDAs). Inside the equipment, there is equipped with a liquid crystal display control device (LCD controller) implemented in a semiconductor integrated circuit responsible for control of display on the liquid crystal panel and an LCD driver to drive the liquid crystal panel under the control of the control device or an LCD drive and control device (LCD controller/driver) in which the LCD controller and the LCD driver are built in combination.

Description about a display drive and control device (LCD drive and control device) as comprised in a mobile phone using an LCD unit can be found, e.g., in Patent Document 1.

[Patent Document 1] Japanese Unexamined Patent Publication No. 2005-43435

SUMMARY OF THE INVENTION

The present inventors made an investigation into liquid crystal display (LCD) drive and control devices (LCD controllers/drivers) heretofore available to drive an LCD panel of a mobile phone or PDA. According to this investigation, for a random access memory (RAM) provided to store display data in an LCD controller/driver to drive a LCD panel with QVGA resolution, i.e., a resolution of 320×240 pixels, its access cycles at on the order of 10 MHz pose no problem in product specifications. However, in the case of WVGA resolution of 800×480 pixels, it tuned out that a higher rate of memory access cycles is necessary to satisfy the WVGA resolution, as product specifications require keeping a data transfer time as fast as in the case of QVGA in spite of expansion in the data amount to be transferred due to the expanded number of pixels in the WVGA. In this respect, taking account of the provision of the LCD controller/driver in mobile phones and PDAs as well as from the viewpoint of as low current as possible to be consumed in standby state, it is not expedient to improve the RAM performance by enhancing the current carrying capability of the memory device.

An object of the present invention is to provide a technique to achieve a higher rate of memory access cycles without enhancing the current carrying capability of the memory device.

The above-noted object and other objects and novel features of the present invention will become apparent from the description of the present specification and the accompanying drawings.

A typical aspect of the invention disclosed in the present application will be summarized below.

A semiconductor integrated circuit device for display control is provided with a memory cell array in which a plurality of memory cells capable to store display data are arranged in an array, peripheral circuits located in the periphery of the memory cell array to enable writing of display data into the display data memory and reading of the display data from the display data memory, and a control circuit which is able to control read and write operations from/to the memory cell array via the peripheral circuits. The memory cell array comprises a plurality of memory blocks each capable to store the display data. The control circuit comprises a control logic which enables parallel processing of write operations to the memory blocks in such a manner that, before completion of writing of data to one of the memory blocks, writing of data to another memory block is started. Thereby, parallel processing of write operations to the memory blocks is performed.

Advantageous effect that will be achieved by the typical aspect of the invention disclosed in the present application will be briefly described below.

It is thus possible to provide a technique to achieve a higher rate of access cycles to the display data memory without enhancing the current carrying capability of the memory device.

DETAILED DESCRIPTION OF THE PREFERRED EMBODIMENTS

Figure 1:
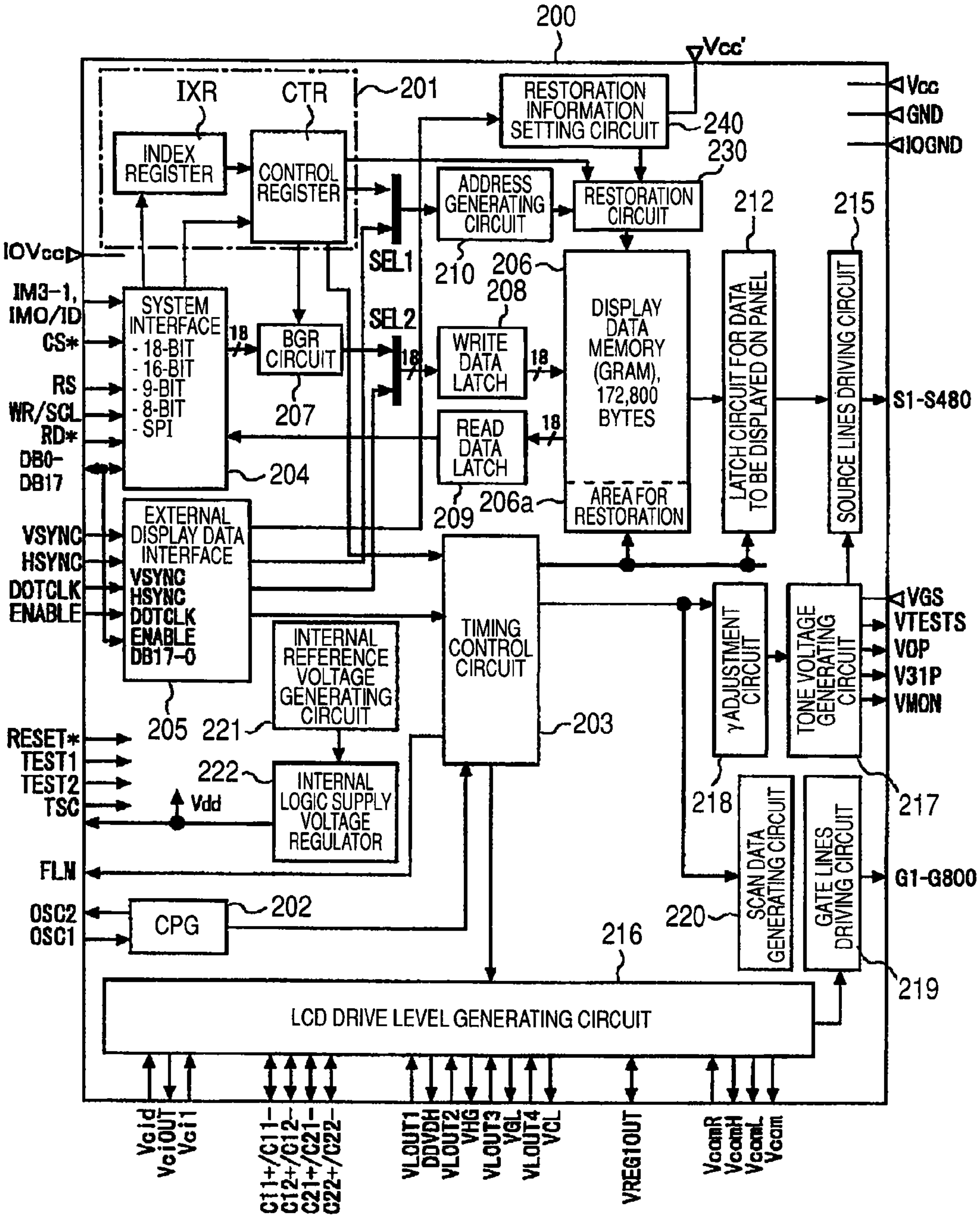
FIG. 1 is a block diagram showing an example of a configuration of an LCD controller/driver which is an example a semiconductor integrated circuit device for display control according to the present invention.

1. Representative Embodiment. First, a representative embodiment of the invention disclosed herein is outlined. In the outline description of the representative embodiment, a reference symbol or number given in parentheses to identify a component in a drawing is only exemplary of an entity encompassed in the concept of the component to which the reference symbol or number is assigned.

[1] A semiconductor integrated circuit for display control (200) according to the representative embodiment of the present invention includes a memory cell array (ARY) in which a plurality of memory cells capable to store display data are arranged in an array, peripheral circuits (100-1, 101-1, 102-1, 103-1) located in the periphery of the memory cell array to enable writing of display data into the memory cell array and reading of the display data from the memory cell array, and a control circuit which is able to control read and write operations from/to the memory cell array via the peripheral circuits. The memory cell array includes a plurality of memory blocks (100-2, 101-2, 102-3, 103-2) each capable to store the display data. The control circuit includes a control logic (400) which enables parallel processing of write operations to the memory blocks in such a manner that, before completion of writing of data to one of the memory blocks, writing of data to another memory block is started. By means of this configuration, it is possible to shorten a write cycle and achieve a higher rate of memory access cycles, as parallel processing of write operations to the memory blocks is performed in such a manner that, before the completion of writing of data to one of the memory blocks, writing of data to another memory block is started. Furthermore, in this case, there is no need to enhance the current carrying capability of the memory device.

[2] More specifically, in the semiconductor integrated circuit for display control (200) according to one embodiment of the present invention, the control logic can be configured to, before completion of writing of one pixel data to one memory block, cause to start writing of next pixel data to another memory block, when writing data to the memory cell array is performed in units of one pixel data.

[3] The memory cell array can be divided into a plurality of memory blocks column-wise and row-wise.

[4] The control logic is configured to be able to make sequential operations by input access commands, and a data bus (D-BUS) and an address bus (A-BUS) are shared between or among the memory blocks.

[5] A transfer control circuit (401) can be provided to rearrange output data from the memory blocks in a sequence of data line by line to be displayed by a display unit and then transfer the rearranged data to a following circuit.

[6] The transfer control circuit rearranges output data from the memory blocks in a sequence of data line by line to be displayed by a display unit and then transfers the rearranged data to the following circuit, the output data being rearranged during transfer through a bus (F-BUS) on which the output data from the memory blocks can be transmitted in a time division manner to the following circuit.

[7] A window function is provided that enables continuous access to a rectangular region defined by setting optional addresses and, when the number of the memory blocks divided is denoted by n, the number of columns and the number of rows are set to multiples of n.

[8] The semiconductor integrated circuit for display control can be configured such that a command cycle is inserted in a series of write cycles for writing and a command for random access is accepted in the command cycle.

[9] The semiconductor integrated circuit for display control can be configured such that, when N denotes one of memory internal addresses which are sequentially selected during transfer of display data, address N and address N+1 are allocated to different memory blocks.

2. Description of Embodiment. Then, the embodiment is described in greater detail.

Figure 2:
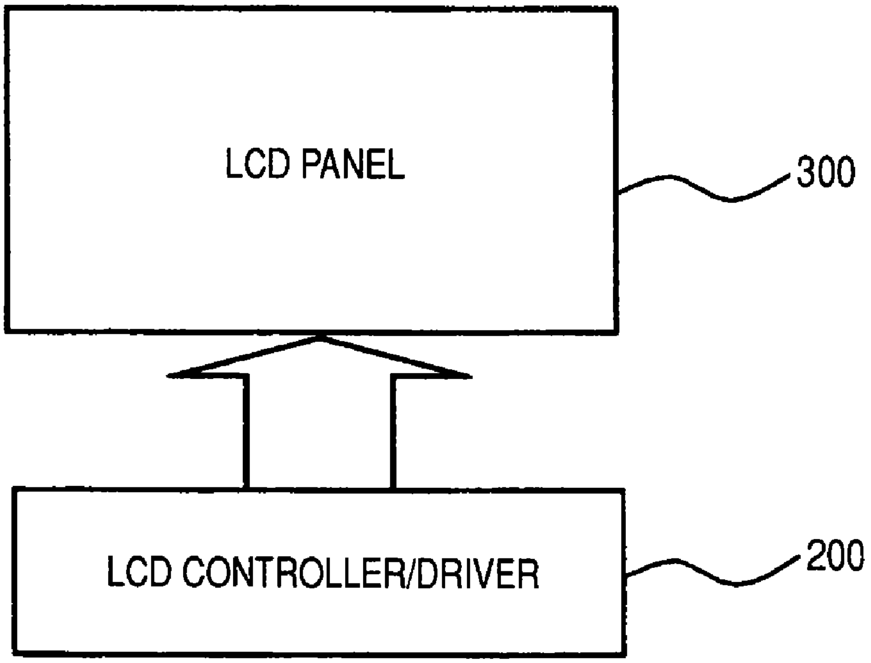
FIG. 2 illustrates the LCD controller/driver and an LCD panel which is driven by it.

FIG. 1 shows a liquid crystal display (LCD) controller/driver which is an example a semiconductor integrated circuit for display control according to the present invention. This LCD controller/driver 200 drives a dot matrix type LCD panel 300, as is shown in FIG. 2. Although not restrictive, the LCD panel 300 supports WVGA and has a resolution of 800×480 pixels. As shown in FIG. 1, the LCD controller/driver 200 includes a display data memory 206 as a memory to store data which is displayed graphically on the dot matrix type LCD panel and is constructed as a semiconductor integrated circuit on a single semiconductor substrate, together with circuits for writing and reading to/from the memory and drivers which output LCD panel drive signals.

The LCD controller/driver 200 is provided with a control unit 201 which controls all parts internal to the chip, according to a command from an external microprocessor, microcomputer, or the like. Also, it is provided with a pulse generator 202 which generates a reference clock pulse internal to the chip, based on an oscillation signal from outside or an oscillation signal from an oscillator coupled to an external terminal, and a timing control circuit 203 which generates a timing signal for operation timing of various circuits internal to the chip, based on the clock pulse.

It is further provided with a system interface 204 which receives, inter alia, instructions and data such as still display data transmitted via a system bus which is not shown from a microcomputer or the like and sends display data to the microcomputer. It is further provided with an external display data interface 205 which receives, inter alia, moving image data and horizontal and vertical synchronization signals HSYNC, VSYNC transmitted via a display data bus which is not shown from an application processor or the like.

Further more, the LCD controller/driver 200 is provided with a display data memory 206 which stores display data in bitmap form and a bit conversion (BGR) circuit 207 which performs bit manipulation such as rearranging bits of RGB data to write from the microcomputer. It is further provided with a write data latch circuit 208 which latches and holds display data converted by the bit conversion circuit 207 or display data input via the external display data interface 205, a read data latch circuit 209 which holds display data read from the display data memory 206, and an address generating circuit 210 which generates a selected address on the display data memory 206.

The display data memory 206 is made up of a memory array including a plurality of memory cells, word lines, and bit lines (data lines) and a readable/writable RAM having an address decoder which decodes an address supplied from the address generating circuit 210 into a signal selecting a word line and a bit line within the memory array. The display data memory 206 also includes a sense amplifier which amplifies a signal read from a memory cell and a write driver which applies a given voltage to a bit line within the memory array according to write data. Although not respective, in this embodiment, the memory array is configured to have a storage capacity of 172,800 bytes and allow data to be read from and written into a column (18 bits) by a 17-bit address signal.

There is further provided a latch circuit 212 for data to be displayed on panel for sequentially latching display data read from the display data memory 206. The LCD controller/driver is also provided with an LCD drive level generating circuit 216 which generates voltages at multiple levels required to drive the liquid crystal panel, a tone voltage generating circuit 217 which generates tone voltages required to generate waveform signals for displaying color and grayscale images, and a gamma (γ) adjustment circuit 218 which sets tone voltages to correct the gamma (γ) characteristic of the liquid crystal panel.

Following the latch circuit 212 for data to be displayed on panel, a source lines driving circuit 215 is provided which chooses voltages corresponding to data output from the latch circuit 212 for data to be displayed on panel from among the tone voltages supplied from the tone voltage generating circuit 217 and outputs the voltages (source lines driving signals) S1-S480 which are, in turn, applied to the source lines as signal lines of the liquid crystal panel. Besides, there are provided a gate lines driving circuit 219 which outputs voltages (gate lines driving signals) G1-G800 which are applied to the gate lines (also called common lines) as select lines of the liquid crystal panel and a scan data generating circuit 220 consisting of shift registers and the like which generate scan data for driving each of the gate lines of the liquid crystal panel to the selected level in order.

There are further provided an internal reference voltage generating circuit 221 which generates an internal reference voltage and a voltage regulator 222 which generates a supply voltage VDD which may be, e.g., 1.5 V for internal logic circuits by stepping down an externally supplied voltage Vcc which may be, e.g., 3.3 V or 2.5 V. In FIG. 1, SEL1, SEL2 are data selectors, each of which allows passage of any of multiple input signals under the control of a select signal output by the timing control circuit.

The control unit 201 is provided with a control register CTR for control of the operating state of the chip such as an operating mode of the LCD controller/driver 200 and an index register IXR for storing index information for reference to the control register CTR and the display data memory 206. When the external microcomputer or the like specifies an instruction to execute by writing it into the index register IXR, the control unit 201 generates and outputs a control signal corresponding to the specified instruction.

Under the control of the control unit 201 configured as above, the LCD controller/driver 200 performs a rendering process where it sequentially writes display data into the display data memory 206 for displaying an image on the liquid crystal panel which is outside of the drawing according to a command and data from the microcomputer or the like. The LCD controller/driver also performs a reading process where it reads display data periodically from the display data memory 206 and generates and outputs signals which are applied to the sources lines of the liquid crystal panel as well as generates and outputs signals which are applied to the gate lines sequentially.

The system interface 204 receives signals such as data to be set in the registers and display data, which are needed for rendering into the display data memory 206, transmitted from the system control device such as the microcomputer and sends display data to the system control device. In this embodiment, the system interface is configured such that any interface can be selected among 18-bit, 16-bit, 9-bit, 8-bit parallel or serial input/output interfaces as Series 80 interfaces, according to the states of IM3-1 and IM0/ID terminals.

The LCD controller/driver 200 is provided with a restoration circuit 230 for the display data memory 206, which restores erroneous bits of data contents of the memory, and a restoration information setting circuit 240 which preserves the address of a memory row to be restored including erroneous bits as restoration information. Although not restrictive, as the restoration information setting circuit 240, a fuse circuit which can store the address of a memory row or column to be restored is used. According to the restoration information set in the restoration information setting circuit 240, the restoration circuit 230 replaces a word line or data line section including erroneous bits in the display data memory 206 with a redundant section. In the display data memory 206, an area for restoration 206*a* (reserve storage area) is provided separately in addition to a normal storage space for storing display data. This area for restoration 206*a* includes a word line restoration area for restoring word lines and a data line restoration area for restoring data lines. Redundant restoration by the restoration circuit 230 is carried out according to the information set in the restoration information setting circuit 240. This may take place in each case, when display data is written into the display data memory 206 via the write data latch circuit 208, when data stored in the display data memory 206 is read for transfer to the system side, and when data stored in the display data memory 206 is read via the latch circuit 212 for data to be displayed on panel.

Figure 3:
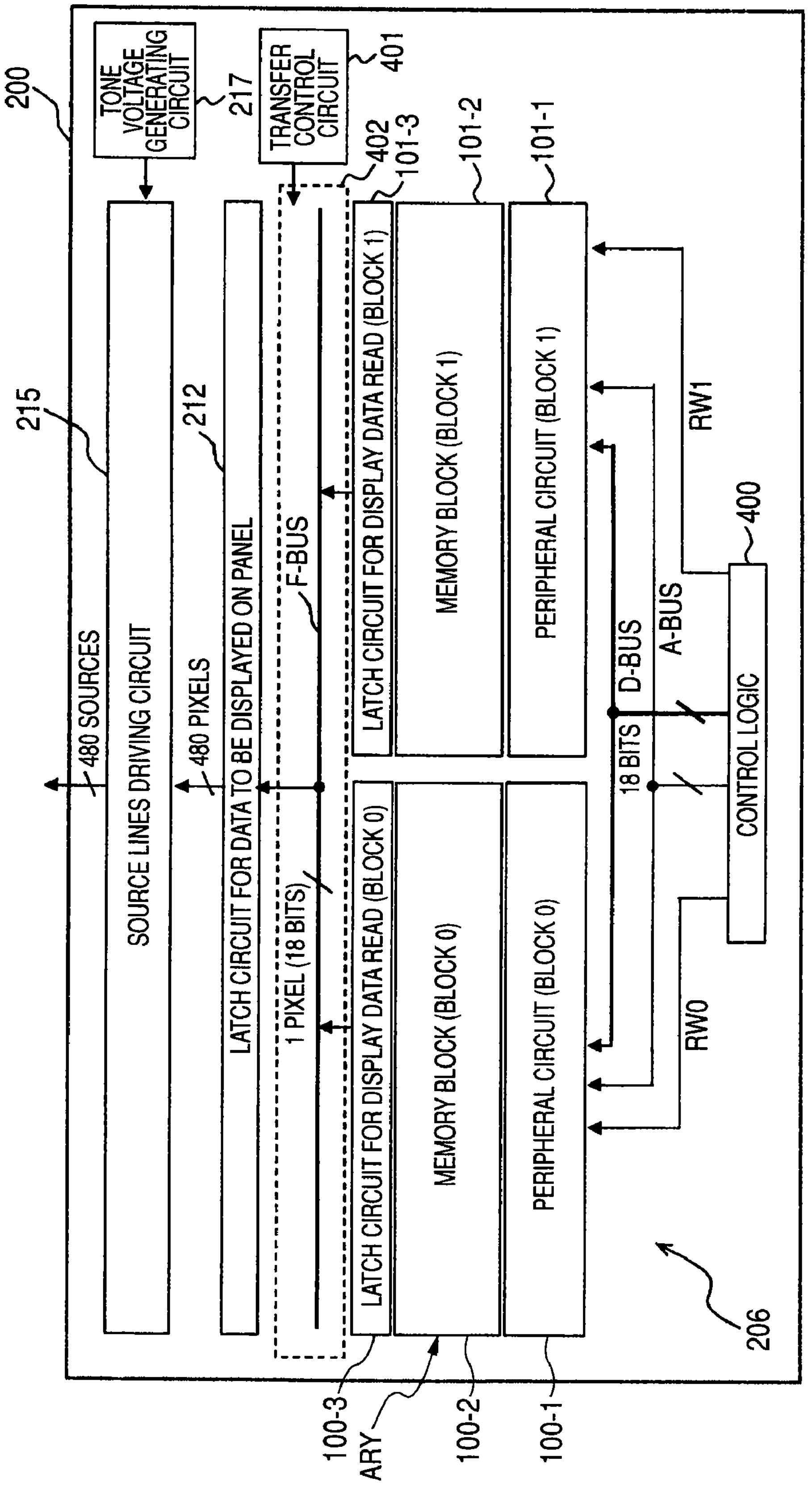
FIG. 3 is a block diagram showing an example of a configuration of a main part of the LCD controller/driver.

FIG. 3 shows an example of a configuration of a main part of the LCD controller/driver 200.

The display data memory 206 includes a memory cell array ARY in which memory cells capable to store display data are arranged row-wise and column-wise in an array and a control logic 400. The memory cell array ARY is divided into two memory blocks 100-2, 101-2, row-wise.

In the periphery of a memory block (block0) 100-2, a peripheral circuit 100-1 and a latch circuit 100-3 for display data read capable of latching display data output from the memory block 100-2 are located.

In the periphery of a memory block (block1) 101-2, a peripheral circuit 101-1 and a latch circuit 101-3 for display data read capable of latching display data output from the memory block 101-2 are located.

The control logic 400 outputs read/write control signals RW0, RW1 respectively for the memory blocks, data, and address signals. A read/write control signal RW0 is supplied to the peripheral circuit 100-1 and this read/write control signal RW0 enables control of reading data from the memory block 100-2 and control of writing data into the memory block 100-2. A read/write control signal RW1 is supplied to the peripheral circuit 101-1 and this read/write control signal RW1 enables control of reading data from the memory block 101-2 and control of writing data into the memory block 101-2. The control logic 400 is coupled to the peripheral circuits 100-1, 101-1 via a data bus D-BUS. Sending/receiving of data to/from the peripheral circuits 100-1, 101-1 can be performed via this data bus D-BUS. Further, the control logic 400 is coupled to the peripheral circuits 100-1, 101-1 via an address bus A-BUS. Transfer of a read address and a write address to the peripheral circuits 100-1, 101-1 can be performed via this address bus A-BUS.

In the present example, internal logical addresses are allocated to the memory blocks 100-2, 101-2 as follows.

Figure 5A:
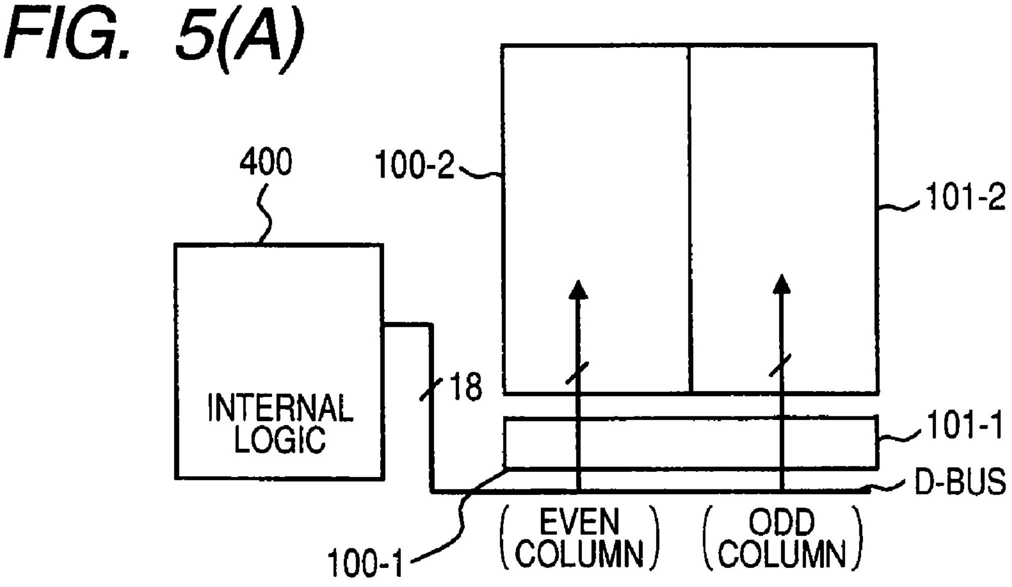
FIGS. 5A and 5B illustrate row-wise writing to memory blocks in the configuration shown in FIG. 3.
Figure 5B:
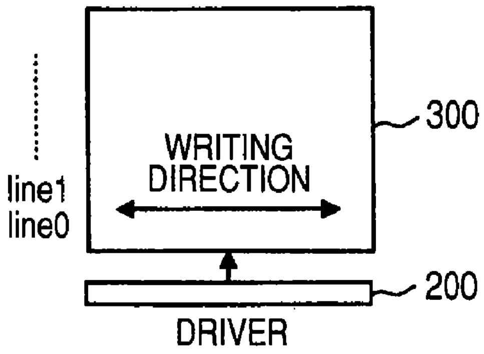

Even column addresses are allocated to the memory block 100-2 and odd column addresses are allocated to the memory block 101-2. By address allocation in this way, pixel-by-pixel display data is written into different blocks in the display data memory 206 depending on the column address which is even or odd, as is illustrated in FIG. 5A. That is, during continuous row-wise access, data is written into the memory block (block0) 100-2, if an even column address is provided to the display data memory 206, and data is written into the memory block (block1) 101-2, if an odd column address is provided to the display data memory 206. Upon each increment or decrement of column addresses, an even column and an odd column are alternately given. Accordingly, display data is distributed between the memory block (block0) 100-2 and the memory block (block1) 101-2 and written into each block. This writing is defined as row-wise writing corresponding to the horizontal direction of the LCD panel 300, as is illustrated in FIG. 5B. For row-wise writing to the display data memory 206, there may be four patterns by different combinations of increment and decrement of row addresses and column addresses.

Figure 10A:
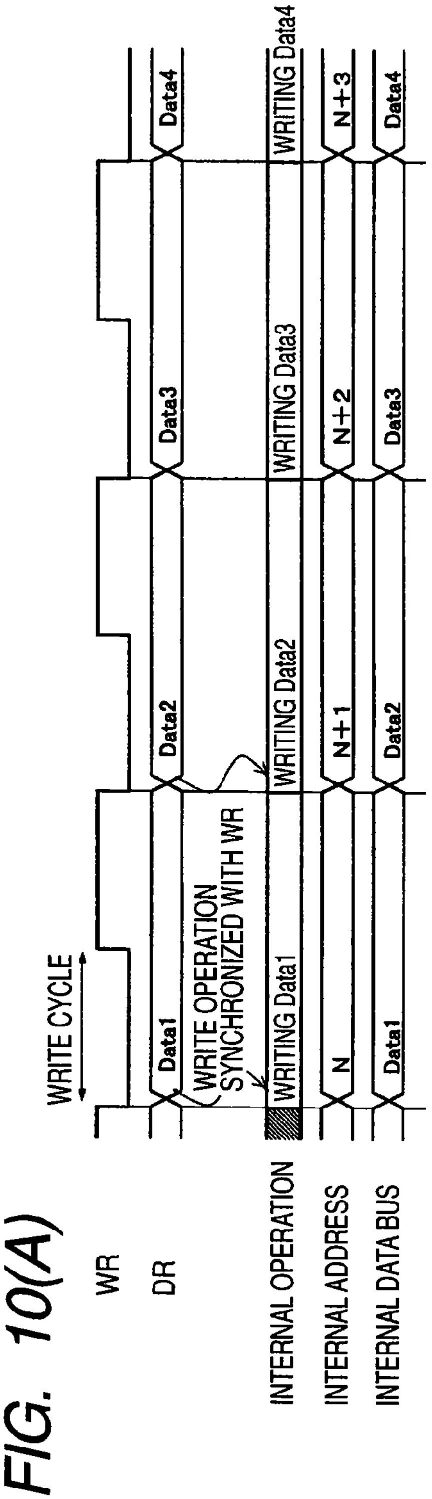
FIGS. 10A and 10B are timing diagrams of writing operation to the display memory in the configuration shown in FIG. 3.
Figure 10B:
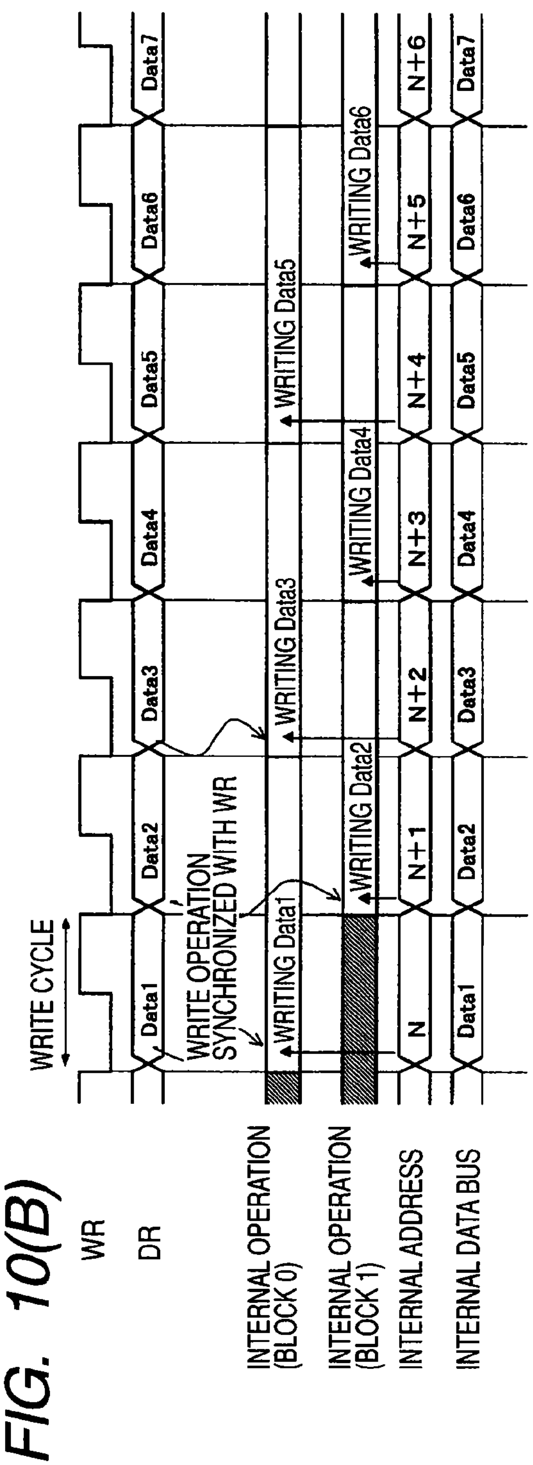

FIGS. 10A and 10B show the timings of writing operations to the display data memory 206.

FIG. 10B shows the timing of writing operation to the memory configured as shown in FIG. 3 and FIG. 10A shows the timing of writing operation, provided for comparison purposes.

Here, unlike the configuration shown in FIG. 3, in the case where the memory is not divided into blocks, as shown in FIG. 10A, each time a write enable signal WR is asserted to low level, display data (Data) from an external data bus DB is transferred through an internal data bus. At this time, an internal address signal is given by which writing data into the display data memory 206 is performed. In this case, after the completion of writing of one pixel data in the current write cycle, writing of another pixel data is started in the next write cycle. For example, after the completion of writing of first display data Data1 for one pixel, writing of next display data Data2 for one pixel is started in the next write cycle. After the completion of writing of this display data Data2, writing of next display data Data3 for one pixel is started in the next write cycle.

On the other hand, according to the configuration shown in FIG. 3, due to that even column addresses are allocated to the memory block 100-2 and odd column addresses are allocated to the memory block 101-2, as shown in FIG. 10B, before the completion of writing of data into the memory block 100-2, writing of data into the memory block 101-2 can be started. Before the completion of the writing into the memory block 101-2, writing of data into the memory block 100-2 can be started. For example, before the completion of writing of first display data Data1 for one pixel into the memory block (block0) 100-2, writing of next display data Data2 for one pixel into the memory block 101-2 can be started in the next write cycle. Before the completion of writing of this display data Data2, writing of next display data Data3 for one pixel into the memory block 100-2 can be started in the next write cycle. In this way, writing data into the memory block 100-2 and writing data into the memory block 101-2 can be performed in parallel. Consequently, the writing operation shown in FIG. 10B can make the write cycles shorter than those in the case as shown in FIG. 10A and can achieve a higher rate of memory access cycles. In addition, this does not require enhancing the current carrying capability of the memory device.

As explained above, internal logical addresses are allocated to the display data memory 206 and data is written into the memory block (block0) 100-2 if the column address is even and data is written into the memory block (block1) 101-2 if the column address is odd. Therefore, when display data is read from the display data memory 206, the display data is rearranged to conform to physical addressing corresponding to the arrangement of the terminals of the LCD panel 300. This rearrangement of the display data is performed by a transfer circuit 402 under the control of the transfer control circuit 401.

It should be noted that the write operation is terminated after the memory is placed in a readable state. This is intended for a higher rate of reading of data to be displayed on the LCD panel 300 which operates asynchronously.

Figure 7:
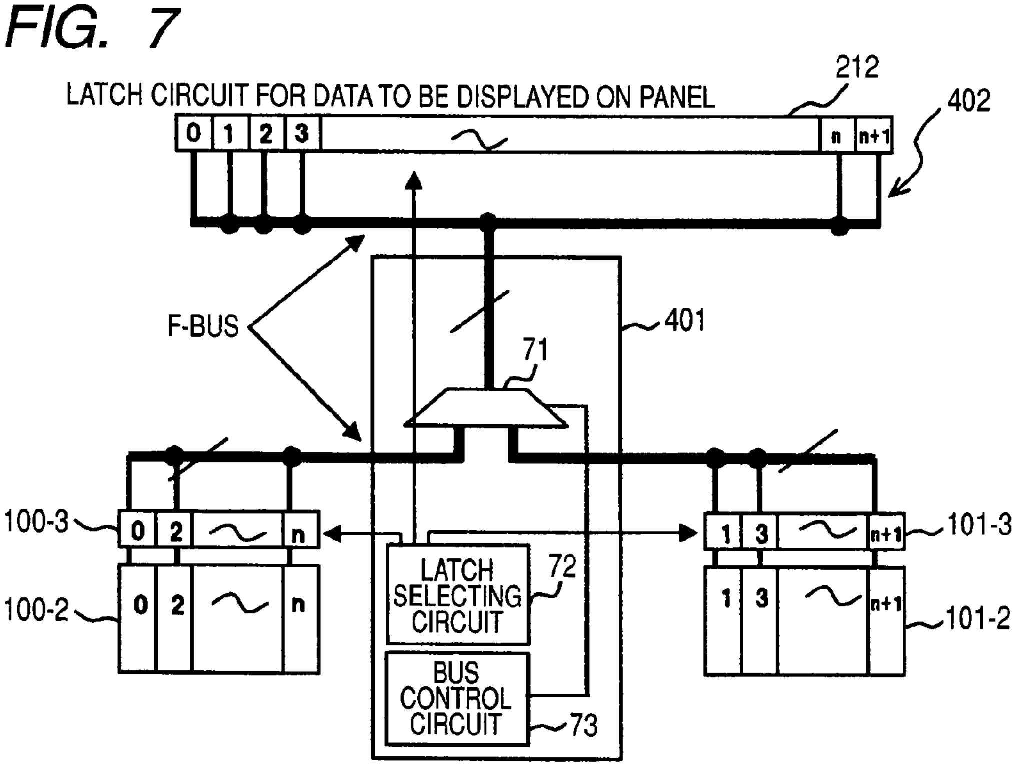
FIG. 7 is a block diagram showing another example of a configuration of the main part of the LCD controller/driver.

FIG. 7 shows an example of a configuration of the transfer control circuit 401 and the transfer circuit 402.

The transfer control circuit 401 includes a selector 71, a latch selecting circuit 72, and a bus control circuit 73, as shown in FIG. 7. The latch circuits 100-3, 101-3 for display data read, the latch circuit 212 for data to be displayed on panel, and the selector 71 are coupled by a transfer bus F-BUS. The selector 71 is provided to selectively transfer either of output data from the latch circuit 100-3 for display data read and output data from the latch circuit 101-3 for display data read to the latch circuit 212 for data to be displayed on panel. The latch selecting circuit 72 selectively places either of the latch circuits 100-3, 101 3 for display data read in the data output state. The bus control circuit 73 enables time-division transfer of display data from the latch circuits 100-3, 101 3 for display data read to the latch circuit 212 for data to be displayed on panel by controlling the operation of the selector 71.

Figure 8:
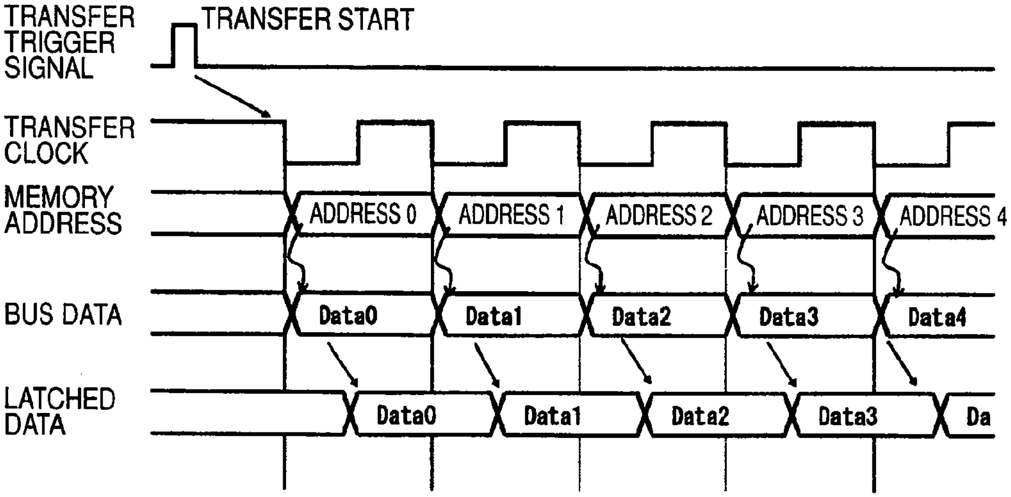
FIG. 8 is an operation timing diagram in the configuration shown in FIG. 7.
Figure 9:
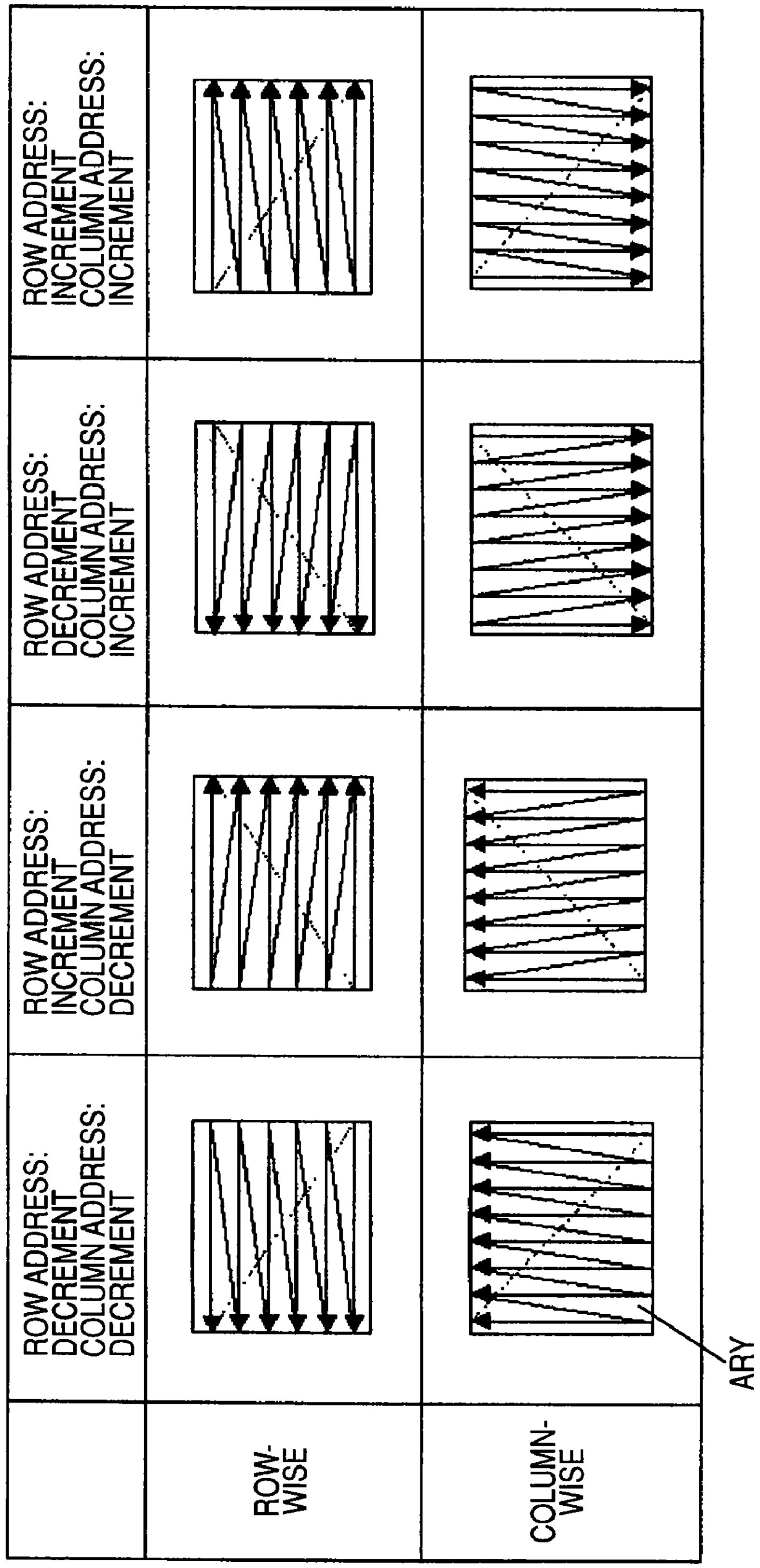
FIG. 9 illustrates row-wise writing and column-wise writing in the LCD controller/driver.

FIG. 8 illustrates a scheme of time-division transfer of the display panel.

When the start of transfer is indicated by a transfer activation signal, data transfer is performed in synchronization with a transfer clock signal. Particularly, display data Data0, Data2, Data4, . . . , n are read from the memory block 100-2 and latched by the latch circuit 100-3 for display data read, while display data Data1, Data3, Data5, n+1 are read from the memory block 101-2 and latched by the latch circuit 101-3 for display data read. Data patch switching is performed by the selector 71, so that display data rearranged in order of Data0, Data1, Data2, Data3, . . . , n, n+1 to conform to the physical addressing corresponding to the arrangement of the terminals of the LCD panel 300 will be latched by the latch circuit 212 for data to be displayed on panel.

Here, in the case where the time-division transfer on the transfer bus F-BUS is not performed, complicated wiring for rearrangement of display data would be inevitable in the wiring region between the latch circuits 100-3, 101-3 for display data read and the latch circuit 212 for data to be displayed on panel. Such wiring region would be a bottleneck in chip size reduction.

On the other hand, if the configuration shown in FIG. 7 is adopted, significant expansion of the wiring region can be avoided by using the transfer bus F-BUS in a time division manner.

According to the example as explained above, the following advantageous effects can be obtained.

(1) Writing data into the memory block 100-2 and writing data into the memory block 101-2 can be performed in parallel; consequently, write cycles can be made shorter and a higher rate of memory access cycles can be achieved. In addition, there is no need for enhancing the current carrying capability of the memory device.

(2) Significant expansion of the wiring region can be avoided by using the transfer bus F-BUS in a time division manner.

Figure 4:
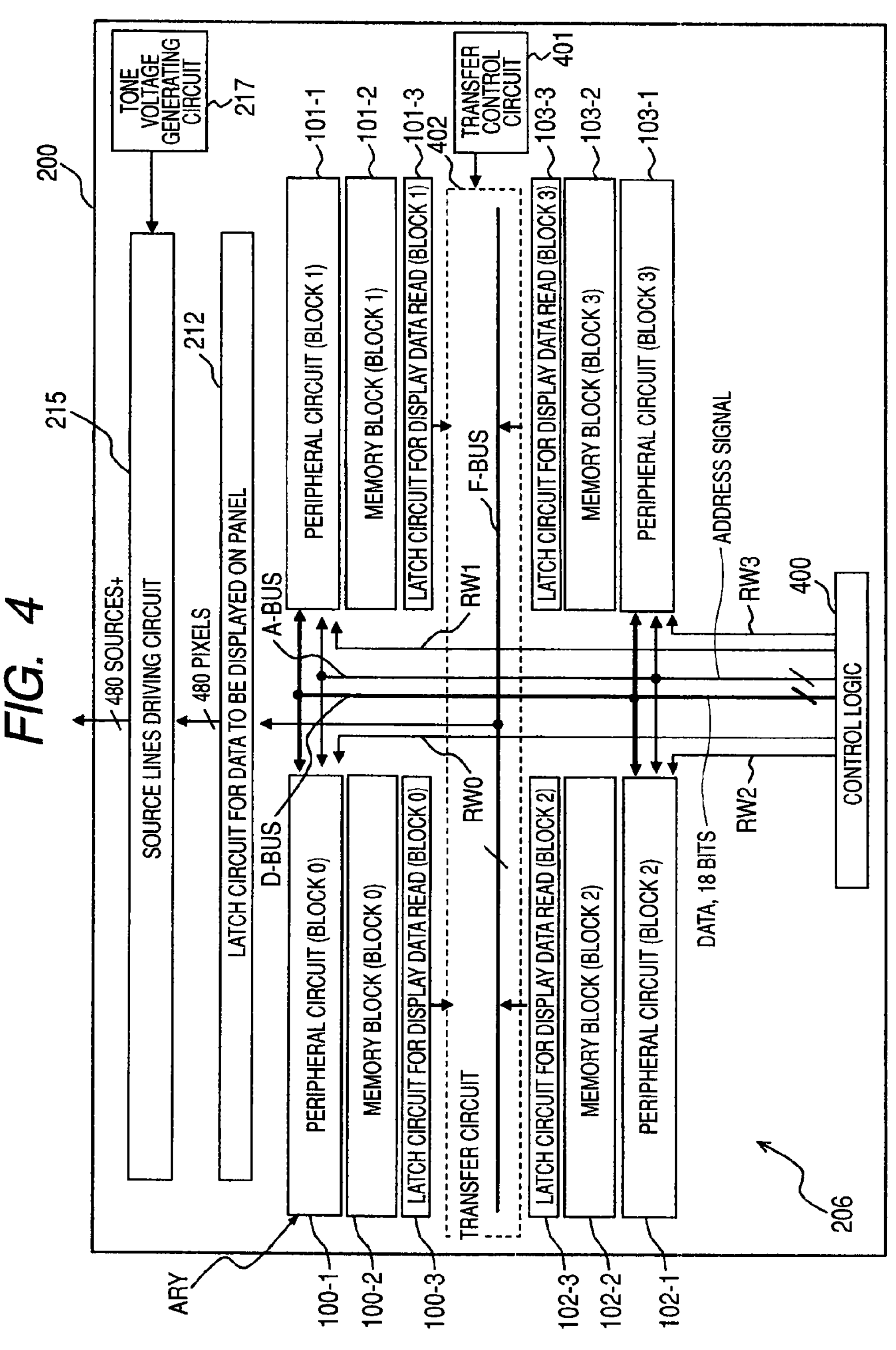
FIG. 4 is a block diagram showing another example of a configuration of the main part of the LCD controller/driver.

FIG. 4 shows another example of a configuration of the main part of the LCD controller/driver 200.

A major difference between the LCD controller/driver 200 shows in FIG. 4 and the same shown in FIG. 3 lies in that the memory cell array ARY is not only divided row-wise, but also divided column-wise. According to the configuration shown in FIG. 4, in particular, the memory cell array ARY is divided into four memory blocks 100-2, 101-2, 102-2, 103-2. With respect to the individual memory blocks, peripheral circuits 100-1, 101-1, 102-1, 103-1 and latch circuits 100-3, 101-3, 102-3, 103-3 for display data read are located adjacently and respectively. A transfer circuit 402 is located between the latch circuits 100-3, 101-3 for display data read and the latch circuits 102-3, 103-3 for display data read. A read/write control signal RW0 is supplied to the peripheral circuit 100-1 and this read/write control signal RW0 enables control of reading data from the memory block 100-2 and control of writing data into the memory block 100-2. A read/write control signal RW1 is supplied to the peripheral circuit 101-1 and this read/write control signal RW1 enables control of reading data from the memory block 101-2 and control of writing data into the memory block 101-2.

A read/write control signal RW2 is supplied to the peripheral circuit 102-1 and this read/write control signal RW2 enables control of reading data from the memory block 102-2 and control of writing data into the memory block 102-2. A read/write control signal RW3 is supplied to the peripheral circuit 103-1 and this read/write control signal RW3 enables control of reading data from the memory block 103-2 and control of writing data into the memory block 103-2. The control logic 400 is coupled to the peripheral circuits 100-1, 101-1, 102-1, 103-1 via the data bus D-BUS. Sending/receiving of data to/from the peripheral circuits 100-1, 101-1, 102-1, 103-1 can be performed via this data bus D-BUS. Further, the control logic 400 is coupled to the peripheral circuits 100-1, 101-1, 102-1, 103-1 via the address bus A-BUS. Transfer of a read address and a write address to the peripheral circuits 100-1, 101-1, 102-1, 103-1 can be performed via this address bus A-BUS.

Internal logical addresses are allocated to the memory blocks 100-2, 101-2, 102-2, 103-2 as follows.

Figure 6A:
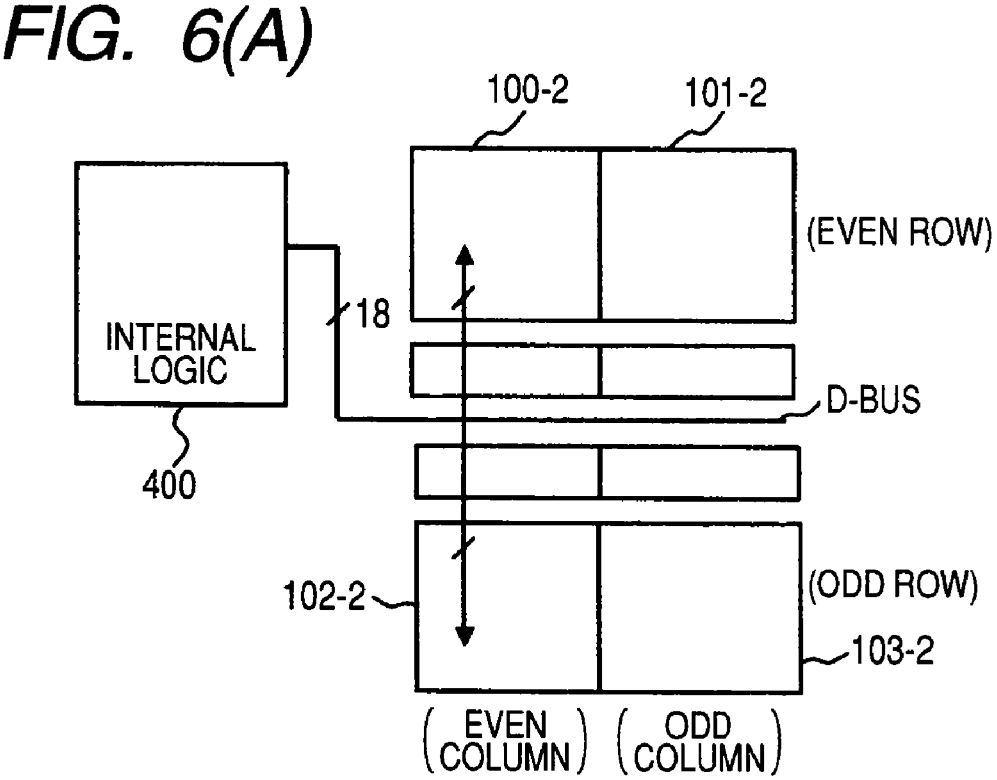
FIGS. 6A and 6B illustrate column-wise writing to memory blocks in the configuration shown in FIG. 4.
Figure 6B:
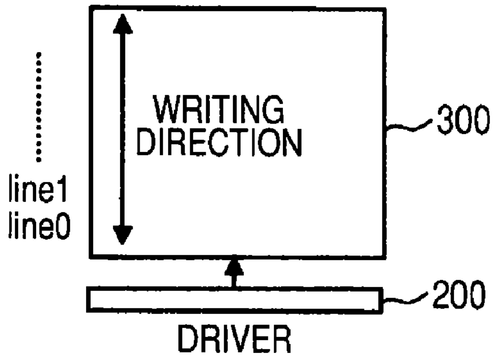

Specifically, even column addresses and even row addresses are allocated to the memory block 100-2. Odd column addresses and even row addresses are allocated to the memory block 101-2. Even column addresses and odd row addresses are allocated to the memory block 102-2. Odd column addresses and odd row addresses are allocated to the memory block 103-2. By address allocation in this way, pixel-by-pixel display data is written into different blocks in the display data memory 206 depending on combination of an even or odd column address and an even or odd row address which are even or odd, as is illustrated in FIG. 6A. In particular, data for which an even column address and an even row address are specified will be written into the memory block 100-2. Data for which an odd column address and an even row address are specified will be written into the memory block 101-2. Data for which an even column address and an odd row address are specified will be written into the memory block 102-2. Data for which an odd column address and an odd row address are specified will be written into the memory block 103-2. Therefore, it is possible to perform column-wise writing corresponding to the vertical direction of the LCD panel 300, as illustrated in FIG. 6B, as well as the row-wise writing corresponding to the horizontal direction of the LCD panel 300, as illustrated in FIG. 5B. For column-wise writing to the display data memory 206, there may be four patterns by different combinations of increment and decrement of row addresses and column addresses.

According to the example as explained above, the following advantageous effects can be obtained.

(1) According to the configuration shown in FIG. 4, because the memory cell array ARY is divided into four memory blocks, writing data into the multiple memory blocks can be performed in parallel. Consequently, write cycles can be made shorter and a higher rate of memory access cycles can be achieved. In addition, there is no need for enhancing the current carrying capability of the memory device.

(2) The memory cell array ARY is not only divided row-wise, but also divided column-wise. This thus enables the column-wise writing corresponding to the vertical direction of the LCD panel 300, as illustrated in FIG. 6B, as well as the row-wise writing corresponding to the horizontal direction of the LCD panel 300, as illustrated in FIG. 5B.

While the invention made by the present inventors has been described specifically hereinbefore, it will be appreciated that the present invention is not limited to the foregoing description and various modifications may be made without departing from the gist of the invention.

Figure 11:
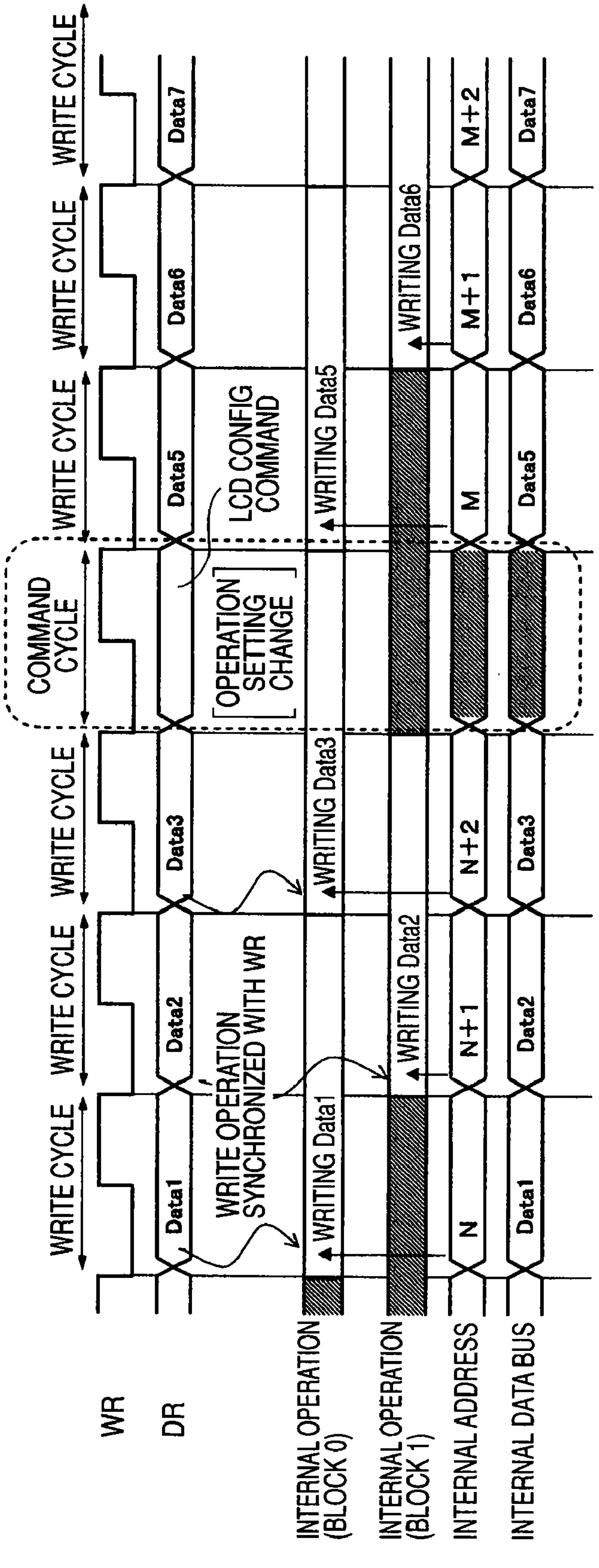
FIG. 11 is an operation timing diagram in another example of a configuration of the LCD controller/driver.

For example, as is illustrated in FIG. 11, a command cycle may be inserted in a series of write cycles and an external command (LCD configuration command) to the LCD controller/driver 200 may be accepted in this command cycle. In this way, the operation setting of the LCD controller/driver 200 can be changed by the external command. As the external command, a command for setting the addresses of the memory blocks address may be received. By reflecting the address in subsequent write accesses, the memory blocks can be accessed randomly.

Figure 12:
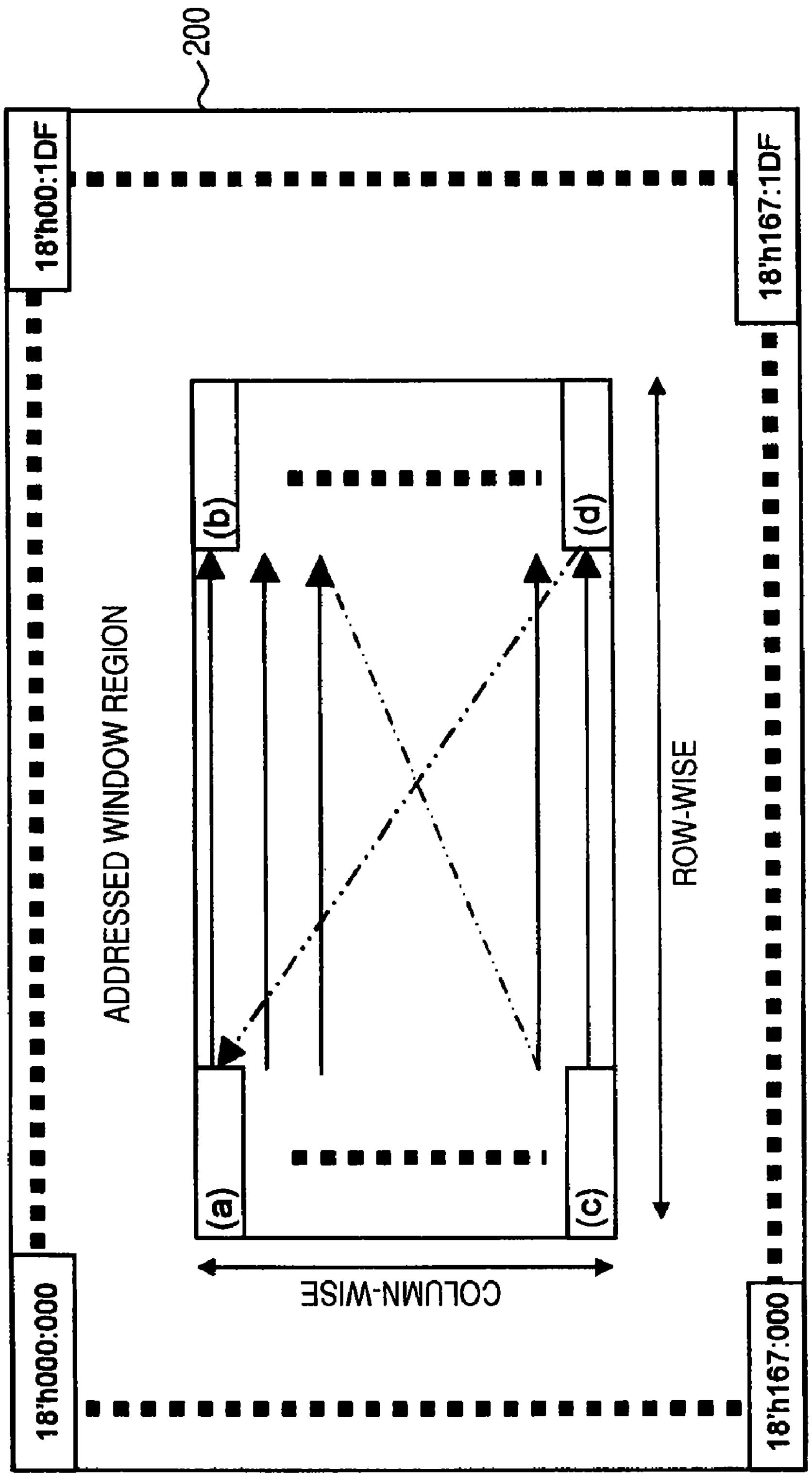
FIG. 12 illustrates another example of a configuration of the LCD controller/driver.

Such a function may be provided that sets optional addresses (a), (b), (c), (d) in the memory cell array ARY and enables continuous access to an optional rectangular region (window region) defined by the addresses, as is illustrated in FIG. 12. If such a window defining function is adopted, when "n" denotes, when the memory cell array is divided into "n" blocks, both the number of columns and the number of rows within the window region are set to multiples of "n". This should be done because of the following reason.

If the memory array is divided into, for example, two blocks, data for which an even column address is specified is written into the memory block (block0) 100-2 and data for which an odd column address is specified is written into the memory block (block1) 101-2. In row-wise writing, given that first data on a first line is written at an even address, the last data on the first line is written at an odd address. So writing of data on a second line can begin at an even address as is the case for the first line. In this way, because the first data on each line can always be written at an even address, reading data from and writing data into the window region is controlled without complication.

The memory cell array may be divided row-wise only or column-wise only or both row-wise and column-wise. In each case, the array may be divided into any number of blocks.

In the foregoing description, the invention made by the present inventors has mainly been explained with respect to its application to the LCD controller/driver that generates and outputs signals for driving the liquid crystal panel, which is regarded as the background usage field of the invention. However, the present invention is not so limited and may also be applied to a semiconductor integrated circuit for display control which drives a non-LCD display such as an organic EL display panel.

What is claimed is:

1. A semiconductor integrated circuit device for display control comprising:

a memory cell array in which a plurality of memory cells capable to store display data are arranged in an array;

peripheral circuits located in the periphery of the memory cell array to enable writing of display data into the memory cell array and reading of the display data from said memory cell array; and a control circuit which is able to control read and write operations from/to the memory cell array via said peripheral circuits, wherein the memory cell array comprises a plurality of memory blocks each including a corresponding portion of the plurality of memory cells, the memory blocks being capable of storing the display data, and wherein the control circuit comprises a control logic which enables row-wise time-staggered parallel processing of write operations to the memory blocks in such a manner that, after starting and before completion of writing of data to one of the memory blocks, writing of data to another memory block is started, wherein the semiconductor integrated circuit device further comprises:

a plurality of first latch circuits configured to read data from corresponding memory blocks, a transfer control circuit to rearrange output data from the plurality of memory blocks in a sequence of data line by line to be displayed by a display unit, the transfer control circuit including a selector to selectively transfer data from one of the first latch circuits;

a second latch circuit configured to read data transferred from the first latch circuits through the selectors; and a source line driving circuit to drive the display unit according to the display data, wherein, when N denotes an internal memory address sequentially selected during transfer of the display data, address N and address N+1 are allocated to memory cells located in different memory blocks, and wherein the selector selects an output of one of the first latch circuits according to each memory address so as to transfer data to the second latch circuit in a time division manner according to the numerical order of memory addresses N and N+1, such that data is transferred in an alternating fashion from the different memory blocks.

2. The semiconductor integrated circuit device for display control according to claim 1, wherein, when writing data to the memory cell array is performed in units of one pixel data, said control logic, after starting and before completion of writing of one pixel data to one memory block, starts writing of next pixel data to another memory block.

3. The semiconductor integrated circuit device for display control according to claim 1, wherein the memory cell array comprises memory cells capable of storing the display data, arranged row-wise and column-wise in an array, the memory cell array being divided into a plurality of memory blocks row-wise.

4. The semiconductor integrated circuit device for display control according to claim 1, wherein the memory cell array comprises memory cells capable of storing the display data, arranged row-wise and column-wise in an array, the memory cell array being divided into a plurality of memory blocks column-wise.

5. The semiconductor integrated circuit device for display control according to claim 1, wherein the memory cell array comprises memory cells capable of storing the display data, arranged row-wise and column-wise in an array, the memory cell array being divided into a plurality of memory blocks row-wise and column-wise.

6. The semiconductor integrated circuit device for display control according to claim 1, wherein the control logic is configured to be able to make sequential operations by input access commands and a data bus and an address bus are shared between or among the memory blocks.

7. The semiconductor integrated circuit device for display control according to claim 1, wherein a window function is provided that enables continuous access to a rectangular region defined by setting optional addresses and, when the number of the memory blocks divided is denoted by n, the number of columns and the number of rows are set to multiples of n.

8. The semiconductor integrated circuit device for display control according to claim 1, wherein a command cycle is inserted in a series of write cycles for writing and a command for random access is accepted in the command cycle.

9. The semiconductor integrated circuit device for display control according to claim 3, wherein, when N denotes one of memory internal addresses which are sequentially selected during transfer of display data, address N is allocated to a first memory block, and address N +1 is allocated to a second memory block, wherein a write operation of the second memory block starts after a start of, and before completion of, a write operation of the first memory block.

10. The semiconductor integrated circuit device for display control according to claim 1, wherein the control logic is configured to perform sequential operations to output display data to the peripheral circuits, and a data bus and an address bus are shared between or among the memory blocks, wherein a period to output the display data to the peripheral circuits is shorter than a period to write the display data to the memory blocks.

* * * * *